United States Patent
Inagaki et al.

[11] Patent Number: 5,986,035
[45] Date of Patent: Nov. 16, 1999

[54] HIGH-MOLECULAR WEIGHT HIGH-ORTHO NOVOLAK TYPE PHENOLIC RESIN

[75] Inventors: Masayuki Inagaki; Shoji Tomita, both of Fujieda, Japan

[73] Assignee: Sumitomo Bakelite Company Limited, Tokyo, Japan

[21] Appl. No.: 09/057,443

[22] Filed: Apr. 9, 1998

[30] Foreign Application Priority Data

Apr. 15, 1997 [JP] Japan ................................. 9-097493
Apr. 15, 1997 [JP] Japan ................................. 9-097494

[51] Int. Cl.⁶ .................. C08G 8/04; C08G 14/04; C08G 8/20
[52] U.S. Cl. ................. 528/129; 528/137; 528/155; 528/165; 525/480
[58] Field of Search ................. 528/129, 137, 528/155, 165, 480; 525/408

[56] References Cited

U.S. PATENT DOCUMENTS

| | | | |
|---|---|---|---|
| 4,097,463 | 6/1978 | Culbertson | 260/57 |
| 5,023,311 | 6/1991 | Kubota | 528/153 |

FOREIGN PATENT DOCUMENTS

| | | |
|---|---|---|
| 0623633A2 | 11/1994 | European Pat. Off. |
| 50-136393 | 10/1975 | Japan |
| A-55-90523 | 7/1980 | Japan |
| A-56-92908 | 7/1981 | Japan |
| 56-103215 | 8/1981 | Japan |
| 57-177011 | 10/1982 | Japan |
| 57-187311 | 11/1982 | Japan |
| A-59-80418 | 5/1984 | Japan |
| 60-260611 | 12/1985 | Japan |
| A-61-12714 | 1/1986 | Japan |
| 62-230815 | 10/1987 | Japan |
| 6-345837 | 12/1994 | Japan |

*Primary Examiner*—Duc Truong
*Attorney, Agent, or Firm*—Smith, Gambrell & Russell, LLP

[57] ABSTRACT

Provided is a high-molecular weight high-ortho novolak type phenolic resin excellent in handleability, heat resistance characteristics, curability and electric characteristics suitable for various uses and superior in balance of properties. This high-molecular weight high-ortho novolak type phenolic resin is a condensate of a trifunctional phenol compound with an aldehyde compound, is soluble in solvents, has a weight-average molecular weight of 50,000 or more calculated by polystyrene standard, has methylene bonds at ortho-ortho position in respect to phenolic hydroxyl group in an amount of 55% or more based on total methylene bonds, and has an extraction water electric conductivity of 10 $\mu$S/cm or less.

5 Claims, 5 Drawing Sheets

HIGH-MOLECULAR WEIGHT HIGH-ORTHO NOVOLAK TYPE PHENOLIC RESIN

INTRODUCTION AND BACKGROUND

The present invention relates to novolak type phenolic resins, and particularly to high-molecular weight novolak type phenolic resins which are very low in content of ionic impurities, high in proportion of methylene groups bonded at ortho—ortho position, and are soluble in solvents, and thus are excellent in handleability, curability, electric characteristics, and heat resistance characteristics and suitable in a wide variety of fields such as molding materials, epoxy resin curing agents, photoresist resins, base resins for carbon materials, thermoplastic resin modifying agents, rubber compounding, etc.

Conventionally known novolak type phenolic resins include those of random novolak type in which methylene groups bond at ortho-position and para-position at nearly the same ratio and those of high-ortho novolak type in which methylene groups bond predominantly at ortho-position. Random novolak type phenolic resins are usually obtained by subjecting a phenol compound and an aldehyde compound to addition condensation reaction using a known organic acid and/or an inorganic acid as a catalyst at 100° C. for several hours under normal pressures, followed by dehydration and removal of unreacted monomers. High-ortho novolak type phenolic resins are usually obtained by subjecting a phenol compound and an aldehyde compound to addition condensation reaction using a metallic salt catalyst such as zinc acetate, lead acetate, zinc naphthenate or the like in weakly acidic state, allowing the dehydration condensation reaction to proceed directly or with further addition of an acid catalyst, and, if necessary, removing unreacted materials. (See, for example, JP-A-55-90523, JP-A-59-80418, and JP-A-62-230815.)

The random novolak type phenolic resins have the problems that they are low in speed of curing with e.g. hexamethylenetetramine, and the high-ortho novolak type phenolic resins obtained using metallic salt catalysts have the problems that metallic ions are contained in the resulting resins and cured products of the resins are inferior in characteristics such as heat resistance, water resistance and electrical insulation, and thus they cannot be used in electrical and electronic fields which hate particularly incorporati on of ionic impurities.

Recently, further improvement in heat resistance characteristics, precision and handling workability is demanded for various uses, and as for phenolic resins, increase of molecular weight, uniformalization of molecular structure and high purification have been intensively investigated.

However, when trifunctional phenol compounds are used as the phenol compounds, novolak type phenolic resins obtained by the above processes have a weight-average molecular weight of about 15,000 at the most.

Recently, high-ortho novolak type phenolic resins obtained by reacting a trifunctional phenol compound with an aldehyde compound for a long time in a nonpolar solvent such as xylene have been reported. (For example, JP-A-6-345837). However, average-molecular weight of the resulting resins is about 3,000–40,000, which is still insufficient.

As other high-molecular weight resins obtained using trifunctional phenol compounds, there are known those obtained by adding a phenol compound to greatly excess amounts of hydrochloric acid and formaldehyde (for example, JP-A-57-177011). However, the resulting resins have methylol group and are not novolak type phenolic resins in a strict sense, and, furthermore, they are partially or completely insoluble in solvents, resulting in severe restriction in their use.

As other high-molecular weight novolak type phenolic resins, many examples of resins obtained using, as the phenol compounds, bifunctional phenol compounds such as o-cresol, p-cresol, p-nonyl phenol, and p-tert-butyl phenol are reported. (For example, Narasaki's, "Kogyo Kagaku Zasshi", Vol.66, P391–395 1963, JP-A-50-136393, JP-A-56-92908, JP-A-56-103215, JP-A-57-187311, JP-A-60-260611, and JP-A-61-12714). However, these resins obtained using such bifunctional phenol compounds cannot be completely cured thereafter.

At present, there are no novolak type phenolic resins which can satisfy the demands in various uses, for example, easy handleability in all uses, less ionic impurities and high heat resistance of the cured products in the use of epoxy resin curing agent, excellent curability and high heat resistance and electric characteristics in the use of molding materials, compatibility with rubber and great increase of rubber hardness in the use of rubber compounding.

The object of the present invention is to provide resins which are suitable for various uses such as molding materials for electric and electronic fields, curing agents for epoxy resins, laminates, base resins for carbon materials, and rubber compounding, and cured products of which are excellent in water resistance, heat resistance characteristics and electrical insulation and which can satisfy all of increase of molecular weight, solubility in solvents, high purification, and uniformalization of molecular structure which could not be simultaneously satisfied by the conventional novolak type phenolic resins.

SUMMARY OF THE INVENTION

The present invention relates to a high-molecular weight novolak type phenolic resin and particularly to a high-molecular weight high-ortho novolak type phenolic resin which is a condensate of a trifunctional phenol compound and an aldehyde compound, characterized in that it is a solvent-soluble high-molecular weight novolak type phenolic resin having a weight-average molecular weight of 50,000 or more calculated by polystyrene standard; that methylene bonds at ortho—ortho position in respect to the phenolic hydroxyl group are 55% or more of total methylene bonds; and that it has an extraction water electric conductivity of 10 $\mu$S/cm or less. The weight-average molecular weight is preferably 100,000 or more.

BRIEF DESCRIPTION OF DRAWINGS

The object, features and advantages of the present invention will be better understood from the following description taken in connection with the accompanying drawing in which.

Figure 1:
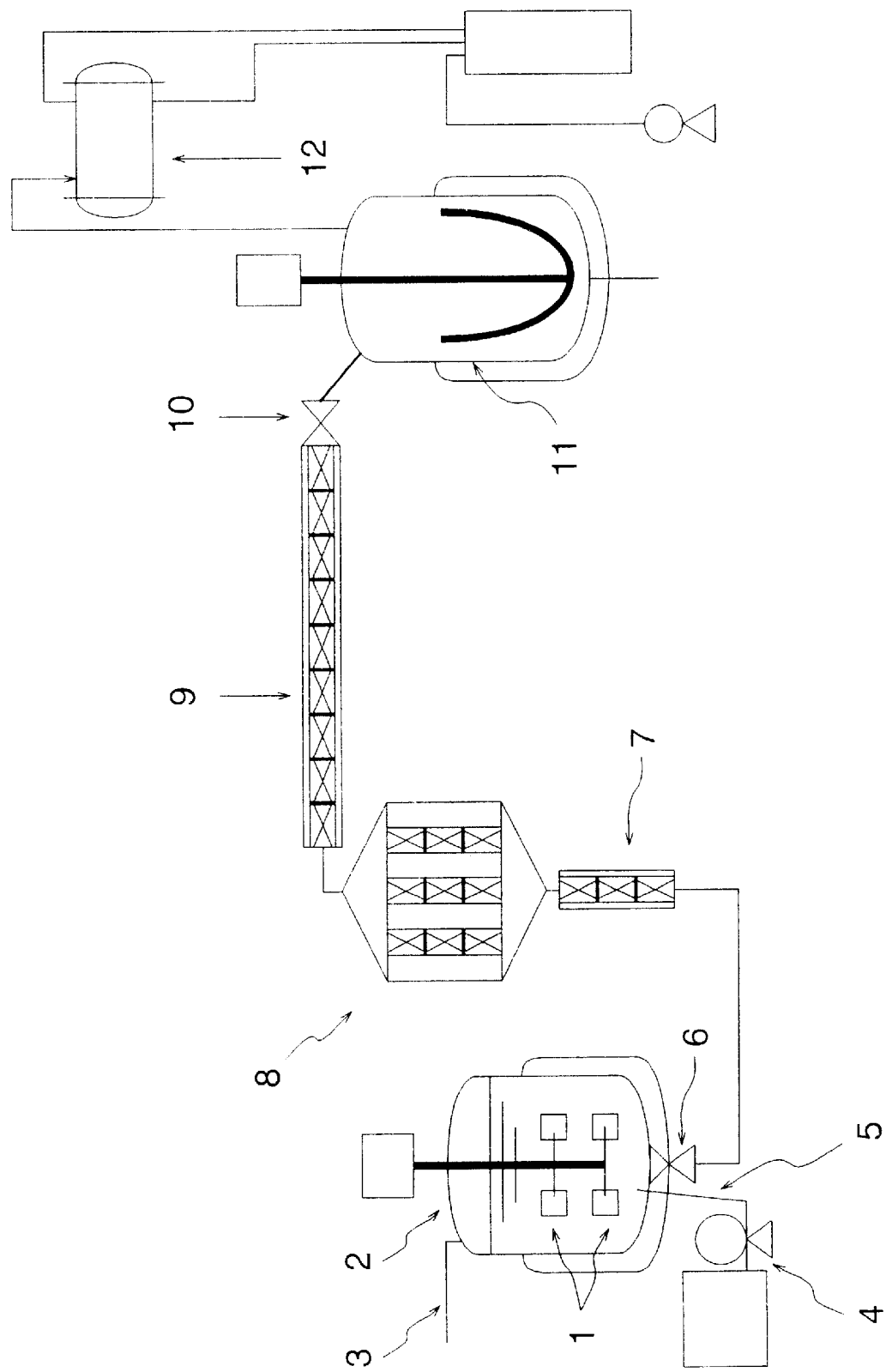
FIG. 1 schematically shows one example of the production steps of the phenolic resin of the present invention.

1: Turbine type agitating blade; 2: High pressure reaction vessel; 3: Nitrogen gas introduction line; 4: High pressure metering pump for aldehyde compounds; 5: Aldehyde compound injection nozzle; 6: Discharging valve at the bottom of reaction vessel; 7: Double-tube type stationary mixer; 8: Multiple-tube heat exchanger type mixer; 9: Double-tube type stationary mixer; 10: Pressure regulating valve; 11: Flash vessel; 12: Heat exchanger.

DETAILED DESCRIPTION OF INVENTION

As the trifunctional phenol compounds in the present invention, there are used one or more compounds which have phenolic hydroxyl group and do not have substituents at the positions other than meta-position in respect to the phenolic hydroxyl group, such as phenol, m-cresol, and 3,5-dimethyl phenol. Use of trifunctional phenol compounds which have, as the substituent, alkyl group, aryl group, or the like having many carbon atoms causes no problem, but phenol and/or m-cresol are preferred from the points of curability and uniformity in structure. That is, when phenol compounds having a large substituent are used, molecular weight increases, but the number of phenol nuclei at the same molecular weight decreases, and this leads to, for example, decrease of hydroxyl equivalent number or the subsequent three-imensional curing becomes difficult because of the large substituent.

A feature of the molecular weight of the resin of the present invention is that weight-average molecular weight calculated by polystyrene standard is 50,000 or more, preferably 100,000 or more. Furthermore, depending on use, etc., preferred are those which contain less than 1% by weight of a portion having a molecular weight of 1,000,000 or more, or those which contain 1–10% by weight of the portion having a molecular weight of 1,000,000 or more. The feature of bonding form is that 55% or more of total bonded methylene groups are bonded at ortho—ortho position. When curability is regarded as important, it is preferred that at least 60% of the bonded methylene groups are bonded at ortho—ortho position.

The phenolic resins of the present invention are soluble in solvents such as ketones, e.g., acetone and methyl ethyl ketone, tetrahydrofuran, and N,N-dimethylformamide and easy in handleability while having the high molecular weight which has not been seen in conventional novolak type phenolic resins, and, furthermore, since the para-position high in reactivity is unoccupied, cured products can be obtained in a very short time with addition of, for example, hexamethylenetetramine. Moreover, when the resins are used as curing agents for epoxy resins, cured products having a very high glass transition point can be obtained.

Furthermore, due to another feature that the content of ionic impurities is small, the phenolic resins of the present invention are superior in electrical insulation and moisture absorption resistance, and can be employed for a wide variety of uses including electric and electronic fields.

In the present invention, as a measure which shows content of organic or inorganic ionic substances in the phenolic resin, an electric conductivity of extraction water is employed. This is obtained by adding powdered phenolic resin to pure water, subjecting the mixture to heating and pressurizing treatment, removing the resin, and measuring the electric conductivity of the extraction water.

The higher extraction water electric conductivity means the larger content of ionic impurities in the resin. If the content is large, the resin readily absorbs water and absorption of water causes deterioration in electrical insulation or dimensional stability of the resin.

The extraction water electric conductivity of the phenolic resin of the present invention is specified to be 10 $\mu$S/cm or less, and as a result the resin can have a high reliability even in the uses of electric and electronic fields in which small content of ionic substances is especially severely required, and hence the resin can be applied to a wide variety of uses.

Content of unreacted monomers in the present invention is not especially limited, but is generally 10% or less, preferably 5% or less, more preferably 1% or less. If content of the unreacted monomers is great, there is the possibility of causing problems in environmental health such as offensive smell in handling of the resins, and, besides, problems such as reduction in mechanical strength of cured products, deterioration in moisture resistance, reduction in dimensional stability and decrease in yield of carbon when carbonized. Thus, the content is desirably as small as possible.

The phenolic resins of the present invention are usually produced by a process which comprises subjecting a trifunctional phenol compound and an aldehyde compound to addition condensation reaction at 160–220° C. without using a catalyst and further allowing a reaction for increasing molecular weight to proceed with dehydration at 200–250° C. If necessary, the resulting resins are dissolved in suitable solvents, and then pure water or the like is added thereto, whereby the resins can be precipitated.

An example of a suitable process for the production of the resins of the present invention is explained in more detail below.

A trifunctional phenol compound and an aldehyde compound may be simultaneously charged in a pressure-resistant reaction vessel to react them at 160–220° C. However, preferably the trifunctional phenol compound is first heated to 160° C. or higher, preferably 180–220° C. and pressurized to 0.5 MPa or higher, preferably 0.7 MPa or higher with a known inert gas such as nitrogen gas in a pressure-resistant reaction vessel. Then, the aldehyde compound is sequentially added to the reaction vessel, preferably from the bottom of the reaction vessel.

Molar ratio of the aldehyde compound to the phenol compound is usually in the range of 0.50–0.85, preferably 0.70–0.80, and more preferably 0.73–0.80 in order to further increase the molecular weight. If the molar ratio is lower than 0.50, the resin of sufficient high molecular weight cannot be obtained even at the step of increasing the molecular weight explained hereinafter, and the yield is reduced. If the molar ratio is higher than 0.85, control of molecular weight at the step of increasing the molecular weight is difficult and this causes acceleration of formation of gelled or partially gelled products. When the molar ratio is 0.7–0.8, resins of 100,000 or more in weight-average molecular weight can be easily obtained.

The novolak type phenolic resins having 1% by weight or less of the portion having a molecular weight of 1,000,000 or more can be obtained by carrying out the addition condensation reaction at a relatively low molar ratio (F/P) of 0.50–0.73 at high temperatures and high pressures and carrying out the molecular weight increasing reaction with dehydration at 200–220° C., and separating and removing low-molecular weight components from the produced resin using solvents. In this case, acetone and the like are preferably used as dissolving solvents and toluene and the like are preferably used as solvents added for separation.

The novolak type phenolic resins having 1–10% by weight of the portion having a molecular weight of 1,000,000 or more can be obtained by carrying out the addition condensation reaction at a molar ratio of 0.73–0.80 at high temperatures and high pressures and carrying out the molecular weight increasing reaction with dehydration at 220–250° C., and separating and removing low-molecular weight components from the produced resin using solvents. The solvents used may be the same as used above, and the solvents used for separation may be pure water, hexane or the like.

The aldehyde compounds used in the present invention include one or two or more compounds having aldehyde group, such as formaldehyde, paraformaldehyde, polyoxymethylene, and the like. Suitable one is formalin which has been treated with known ion exchange resins or the like to reduce the content of formic acid to at most 200 PPM, and another one is paraformaldehyde having a purity of at least 80%.

Formalin which is an aqueous solution of formaldehyde, has a concentration of preferably 37% or higher, more preferably 40% or higher. Formaldehyde is apt to produce formic acid through Cannizzaro reaction at the time of formation of formalin and during storage. This formic acid must be removed to such an extent that the concentration is preferably at most 200 PPM, more preferably at most 50 PPM, because not only the formic acid which has not been able to be decomposed is contained in the resulting resin as an ionic impurity, but also it acts as an acid catalyst in the addition condensation reaction of the phenol compound and the aldehyde compound to cause acceleration of bonding of methylene group at para-position.

The paraformaldehyde used is preferably 80% or higher in purity. If the purity is lower, the degree of methylene bonding at ortho-position decreases and this is not preferred. Furthermore, paraformaldehyde is generally solid and is suitable to be added simultaneously with the phenol compound, but when it is added sequentially, it is especially desirable to previously mix a part of the phenol compound with paraformaldehyde to form a solution or slurry.

An example of adding sequentially the aldehyde compound will be explained below.

Mixing ratio of paraformaldehyde and the phenol compound is not particularly limited, but is preferably the ratio which surely gives the mixture a fluidity that can be handled by a known high-pressure pump or slurry pump. Furthermore, in this case, amount of the phenol compound needed for mixing with paraformaldehyde is regarded to be a part of the phenol compound heated in the reaction vessel and the molar ratio is calculated accordingly.

The sequential addition of an aldehyde compound is carried out using known high pressure pumps such as plunger type and diaphragm type or slurry pumps such as rotary positive displacement type eccentric single screw pump (e.g., MONO PUMP manufactured by Heishin Sobi Co., Ltd.) and tube pump, and preferably the aldehyde compound is fed quantitatively into a heated phenol compound from the bottom of a reaction vessel.

It is important that the addition rate is in such a range that a sufficient addition condensation reaction can be performed while keeping a reaction temperature of 160–200° C. and generation of excess reaction heat or excess increase of pressure due to abrupt reaction can be inhibited. The addition rate which depends on also the amount of the aldehyde compound added is usually preferably set so that the addition time is in the range of 15 minutes to 2 hours.

With regard to the position of addition of the aldehyde compound, especially preferred is the addition from the bottom of the reaction vessel which is advantageous in consideration of the problems such as offensive smell at the pressure reduction step, yield, and stability of molecular weight of the resulting resin , although addition from the top of the reaction vessel and addition onto the liquid surface of phenol compound which are generally employed are also possible.

The aldehyde compound added by injection from the bottom of the reaction vessel immediately reacts with the phenol compound and simultaneously a part thereof is vaporized and risen up to the surface of the reaction mixture during which the addition condensation reaction is completed. On the other hand, in the case of addition from the top of the reaction vessel, formaldehyde of low vapor pressure is vaporized at the liquid surface of the phenol compound of high temperature and remains in the vapor phase part of the reaction vessel, and cannot perform a sufficient reaction, or partial reaction at the vapor-liquid interface is promoted and this makes it difficult to control the molecular weight.

The reaction vessels used in the present invention can be general pressure reaction vessels, but more preferred are those which have upper and lower two turbine type agitating blades of the same diameter and which are advantageous for the addition of the aldehyde compound from the bottom of the reaction vessels.

The aldehyde compound added from the bottom of the reaction vessel immediately reacts with the phenol compound, but a part of the aldehyde compound is vaporized and rises through the liquid reaction mixture. In this case, by using the two-stage turbine type agitating blades of the same diameter, the respective agitated flows collide with each other at the intermediate position between the upper and lower turbine type agitating blades to form a residence zone, whereby the rise of the vaporized aldehyde compound is inhibited to promote reaction of the aldehyde compound, improve yield of the resin and make it easy to control the molecular weight to a desired level. In addition, amount of the aldehyde compound gas in the vapor phase portion decreases and the problem of smell can be solved.

The addition condensation product obtained by adding the aldehyde compound to the phenol compound as mentioned above is further kept under the temperature and pressure for several minutes to several hours after completion of the addition of the aldehyde compound, and after confirming that no self-heat generation occurs, the reaction mixture is heated to 200–250° C. While keeping this temperature range, the reaction mixture is subjected to flash dehydration under dropping of pressure through a heat exchanger provided in the reaction vessel to allow the molecular weight increasing reaction to proceed, thereby to obtain the desired resin, which is taken out from the reaction vessel. In this case, the reaction mixture abruptly increases in its viscosity upon dehydration and partial removal of unreacted monomers. When the reaction temperature is lower than 200° C., there is the possibility of the reaction mixture being solidified in the reaction vessel. Furthermore, when the reaction temperature is higher than 250° C., there is the possibility that the molecular weight increasing reaction cannot be controlled, resulting in gelation.

The above steps may be carried out in the same reaction vessel without causing any problem, but it is preferred that for inhibiting reduction of agitation efficiency and heat transfer efficiency caused by the increase of viscosity, the reaction mixture is fed to a stationary mixer reaction vessel from the bottom of the reaction vessel after completion of addition of the aldehyde compound and after confirming that self-heat generation no longer occurs, and then is transferred to the next reaction vessel or a flashing vessel while heating the reaction mixture to 200–250° C., in which a reaction for increasing molecular weight is allowed to proceed while carrying out dehydration.

The stationary mixers used in the present invention are those which have a mixing blade such as twisting blade or turning blade in piping, and when a fluid passes therethrough, the fluid is repeatedly divided and mixed.

Furthermore, if necessary, unreacted monomers are removed by heating under reduced pressure or by using a known thin film evaporator or the like to obtain a high-ortho type novolak phenolic resin having a weight-average molecular weight of 50,000 or more and extremely low in content of ionic impurities.

The resulting resin is completely dissolved in a solvent, then, pure water is added to the solution under agitation to precipitate a resin, followed by removing the solvent to obtain a novolak type phenolic resin having a weight-average molecular weight of 100,000 or more. The solvents used here include preferably organic solvents which are high in solubility with water, for example, ketones such as acetone and methyl ethyl ketone, alcohols such as methanol and ethanol, tetrahydrofuran, and N,N-dimethylformamide, and those which are low in solubility with water, for example, toluene, xylene and hexane. These are used each alone or in admixture of two or more. These solvents are used in an amount of 100–1000 parts by weight per 100 parts by weight of the novolak type phenolic resin. If amount of the solvent is less than 100 parts by weight, the dissolution step is difficult to perform, and the resulting solution is high in viscosity, and mixing with pure water or an organic solvent in the next step becomes difficult. From the point of efficiency, it is not necessary to use the solvent in an amount exceeding 1000 parts by weight, and use of the solvent in such a large amount may cause decrease of yield.

Then, pure water or an organic solvent is added to the solution. The pure water used here preferably has an electric conductivity of 1 μS/cm or less. The organic solvent is selected from the solvents which have a solvency for phenolic resin lower than that of the above-mentioned solvents used for dissolving the above resin and is added under agitation in an amount of 1/10–30 times that of the solvent used for the dissolution of the resins, whereby a resin is precipitated. If amount of pure water or the solvent is less than 1/10 time that of the solvent used for the dissolution, the resin is not sufficiently precipitated, and if it is more than 30 times, the necessary removal of low molecular reaction products cannot be sufficiently performed.

When the solution to which pure water or the organic solvent for precipitating the resin has been added is left to stand as it is, the solution separates into 2 or 3 layers, and the upper layer(s) in this state may be removed, leaving the desired lowermost layer, or the separation of the desired layer may be carried out in suspended state using a known centrifugal separator or a filtration apparatus such as a filter press. This operation may be carried out once or twice or more times without causing problems. Thereafter, the solvent may be removed by a vacuum dryer, or the layer may be molten by re-heating to evaporate the solvent, or the solvent may be removed using a known thin film evaporator after melting, thereby to obtain the desired resin.

One example of the steps for producing the phenolic resin according to the present invention will be explained referring to FIG. 1, which never limits the present invention.

FIG. 1 schematically illustrates one example of the production steps of the phenolic resin according to the present invention. A phenol compound is charged in a high pressure reaction vessel (2) having two upper and lower turbine type agitating blades (1) and then heated to 160° C. or higher, and an inert gas such as nitrogen gas is injected through pressurizing line (3) to pressurize the vessel to 0.5 MPa or higher. After the reaction vessel reaches a given temperature and pressure, an aldehyde compound in an amount necessary to attain the desired molecular weight of the resultinng resin is injected into the reaction vessel from an injection nozzle (5) at the bottom of the reaction vessel by a high pressure metering pump (4).

The injected aldehyde compound and the phenol compound are subjected to addition condensation reaction in the state kept at a reaction temperature of 160–200° C. or higher while the injected aldehyde compound rises up to the liquid surface. After completion of the addition of the aldehyde compound and after confirming that no self-heat generation occurs, discharge valve (6) at the bottom of the reaction vessel is gradually opened to feed the reaction mixture to stationary mixers (7, 8,9), and the reaction mixture under being heated by a heating medium is fed to a flash vessel. In this case, the temperature of the reaction mixture in the stationary mixers is kept at 200–250° C. to allow the molecular weight increasing reaction to proceed, while the pressure is controlled by pressure regulating valve (10).

Water contained in the reaction mixture is immediately evaporated at the inlet of the flash vessel (11), condensed by heat exchanger (12), and removed out of the system. Only the dehydrated novolak type phenolic resin remains in the flash vessel (11), and this flash vessel is also heated so that the resin is not solidified.

Thereafter, the pressure inside the flash vessel (11) is reduced, and the resin is further heated to remove unreacted monomers. The resin is taken out of the vessel and solidified by cooling to obtain a solid high-ortho novolak type phenolic resin having a high molecular weight and containing little ionic impurities.

The following examples and comparative examples are intended to further illustrate the present invention and are not intended to limit the invention in any manner. All "%" are by weight.

EXAMPLE 1

22.0 kg of phenol was charged in a high pressure reaction vessel of 50 l in volume equipped with a heat exchanger, a heating device, and two-stage turbine type agitating blades of the same diameter, which was heated to 180° C., and pressurized to 0.7 MPa with nitrogen gas. Then, 13.1 kg of 40% formalin previously reduced to 50 ppm in its formic acid content by the treatment with ion exchange resin was sequentially added from the bottom of the reaction vessel over a period of 60 minutes by a diaphragm type high pressure metering pump, and an addition condensation reaction of phenol and formalin was carried out. During the reaction, temperature of jacket portion of the reaction vessel and addition rate of the formalin were adjusted so that the reaction temperature was kept in the range of 180–200° C. The temperature was kept for 5 minutes after completion of the addition, and after confirming that no self-heat generation occurred, the reaction mixture was subjected to dehydration reaction while heating so as to keep 220–230° C. and restoring the pressure to normal pressure over a period of 30 minutes through the heat exchanger.

Furthermore, the pressure was reduced to 1.3 KPa to remove unreacted phenol for 30 minutes, and the residue was taken out on a cooled vat to obtain 20.0 kg of a solid novolak type phenolic resin.

Figure 2:
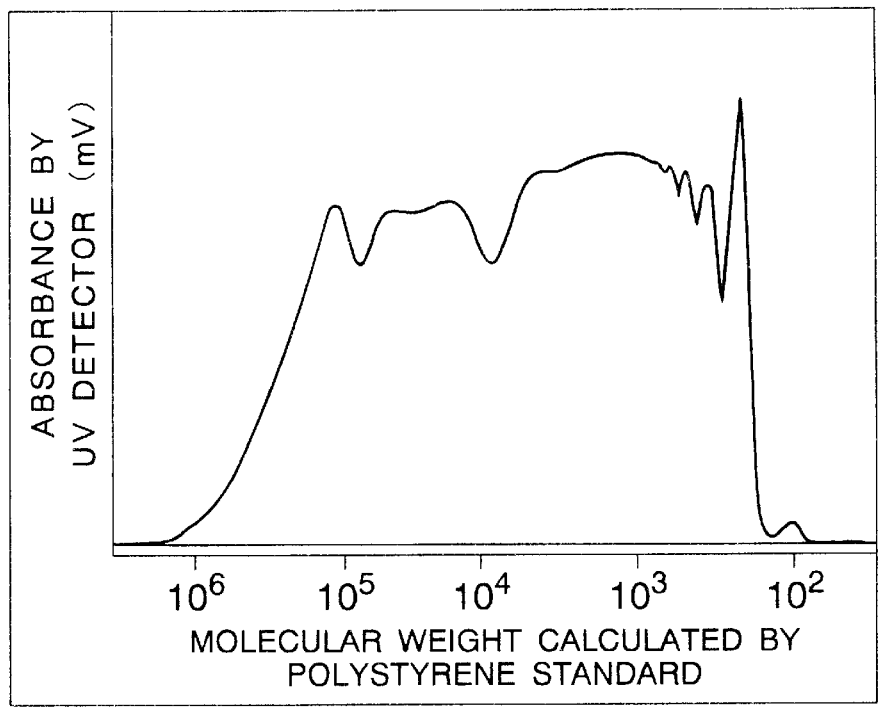
FIG. 2 is a molecular-weight distribution chart (according to gel permeation chromatography (hereinafter referred to as "GPC")) of the resin obtained in Example 1.

FIG. 2 shows a molecular-weight distribution chart of the resulting resin measured by GPC.

EXAMPLE 2

27.0 kg of a novolak type phenolic resin was obtained in the same manner as in Example 1, except that 20.0 kg of phenol was used, 8.1 kg of 88% paraformaldehyde was used as an aldehyde compound, total amount of this paraformaldehyde was previously mixed with 8.0 kg of phenol to prepare a suspension, the suspension was fed from the bottom of the reaction vessel by a plunger type high-pressure metering pump, and removal of unreacted phenol under reduced pressure was not carried out.

Figure 3:
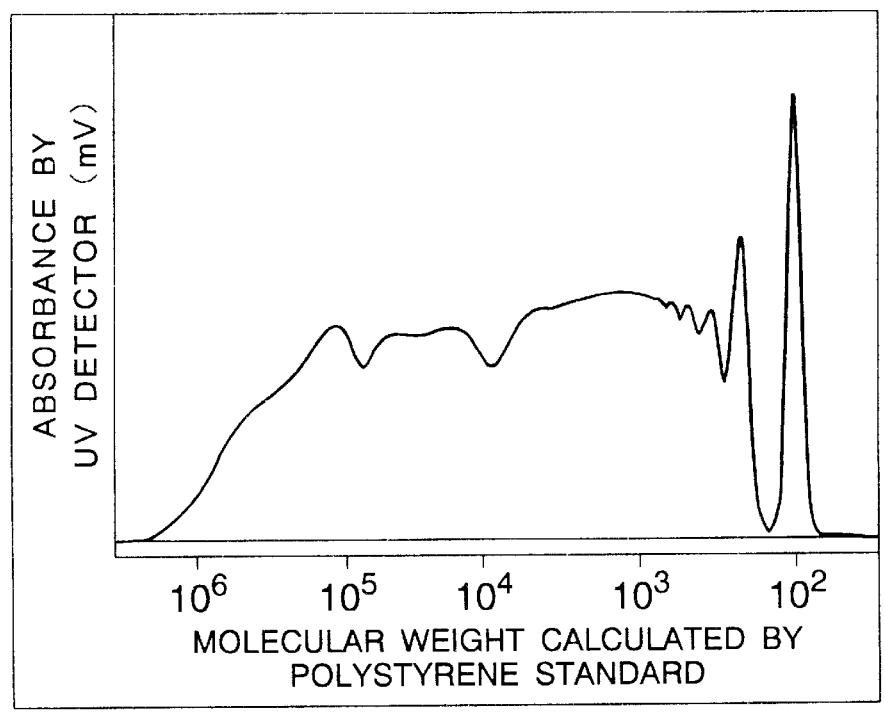
FIG. 3 is a molecular-weight distribution chart (according to GPC) of the resin obtained in Example 2.

FIG. 3 shows a molecular-weight distribution chart of the resulting resin measured by GPC.

EXAMPLE 3

20.0 kg of the novolak type phenolic resin obtained in Example 2 was dissolved in 50.0 kg of acetone. To the solution at 30° C. was added 10.0 kg of pure water over a period of 10 minutes, followed by mixing them for 5 minutes. The mixture was filtered through a filter cloth, and the residue was treated for 2 hours by a vacuum dryer to remove the solvent, thereby obtaining 12.5 kg of a solid novolak type phenolic resin.

Figure 4:
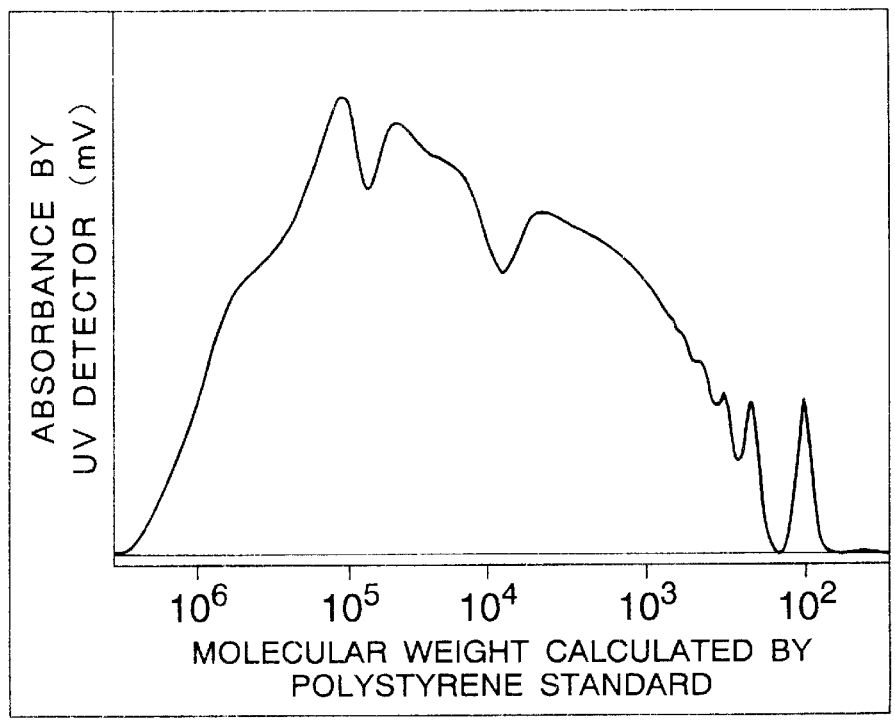
FIG. 4 is a molecular-weight distribution chart (according to GPC) of the resin obtained in Example 3.

FIG. 4 shows a molecular-weight distribution chart of the resulting resin measured by GPC.

EXAMPLE 4

30.0 kg of a novolak type cresol resin was obtained in the same manner as in Example 1, except that 20.0 kg of m-cresol was charged in the reaction vessel as a phenol compound and a mixture of 7.1 kg of 88% paraformaldehyde and 10.0 kg of m-cresol was fed from the bottom of the reaction vessel.

Figure 5:
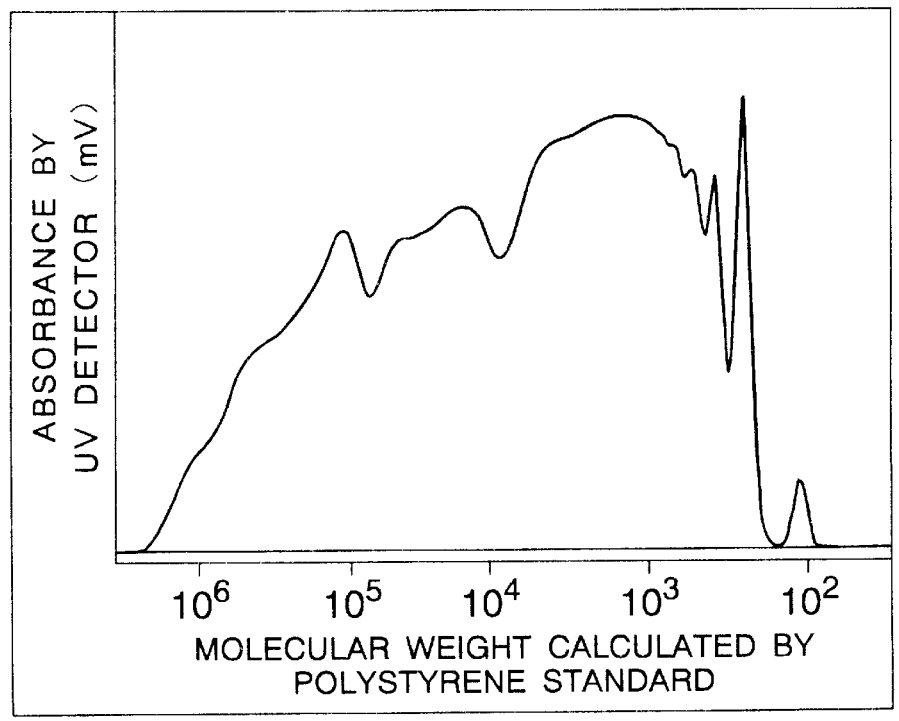
FIG. 5 is a molecular-weight distribution chart (according to GPC) of the resin obtained in Example 4.

FIG. 5 shows a molecular-weight distribution chart of the resulting resin measured by GPC.

EXAMPLE 5

12.0 kg of a solid novolak type cresol resin was obtained in the same manner as in Example 3, except that 20.0 kg of the novolak type cresol resin obtained in Example 4 was dissolved in a mixed solvent comprising 40.0 kg of acetone and 10.0 kg of tetrahydrofuran.

EXAMPLE 6

The procedure of Example 1 until completion of the addition of the aldehyde compound was repeated, except that amount of 40% formalin was 12.4 kg. After confirming that no self-heat generation occurred, the reaction mixture was fed to a double-tube type primary stationary mixer having an inner diameter of 10 mm and a total length of 15000 mm and having twisting blades therein. Then, the reaction mixture was passed through a multiple tube heat exchanger type mixer consisting of a combination of seven stationary mixers having an inner diameter of 8 mm and a total length of 1860 mm and having twisting blades therein, and additionally a secondary and tertiary stationary mixers having the same construction as that of the primary stationary mixer, where addition condensation reaction was carried out. Adjustment of pressure and adjustment of heating of the stationary mixers and the multiple tube heat exchanger type mixer were conducted so that the reaction temperature was kept in the range of 200–210° C. during the reaction. The reaction mixture was continuously fed to the flash vessel to carry out dehydration. Thereafter, the pressure of the flash vessel was reduced to 1.3 KPa to remove unreacted phenol for 30 minutes. Then, 20 kg of acetone was added therein and completely mixed with the resulting resin, and then 30 kg of toluene was added to the mixture at 30° C. over a period of 30 minutes, followed by filtration through a filter cloth and treating by a vacuum dryer for 2 hours to obtain 8.6 kg of a solid novolak type phenolic resin.

Figure 6:
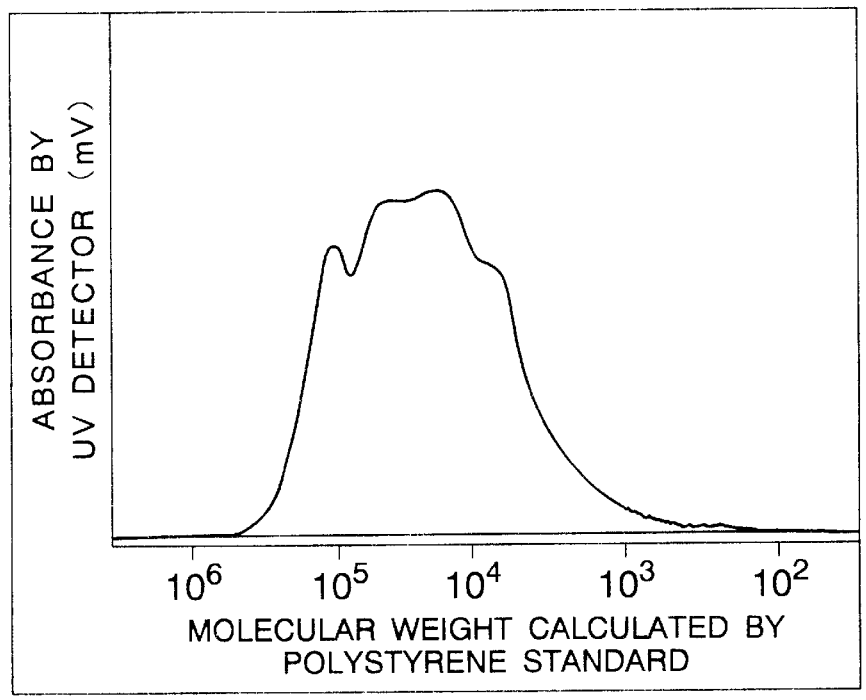
FIG. 6 is a molecular-weight distribution chart (according to GPC) of the resin obtained in Example 6.

FIG. 6 shows a molecular-weight distribution chart of the resulting resin measured by GPC.

EXAMPLE 7

27.0 kg of a novolak type cresol resin was obtained in the same manner as in Example 6, except that 20.0 kg of m-cresol was charged in the reaction vessel as a phenol compound and a mixture of 7.1 kg of 88% paraformaldehyde and 10.0 kg of m-cresol was fed from the bottom of the reaction vessel.

EXAMPLE 8

18.0 kg of a novolak type phenolic resin was obtained in the same manner as in Example 1, except that 40% formalin was added onto the liquid surface from the top of the reaction vessel.

EXAMPLE 9

20 kg of phenol and 5.7 kg of 88% paraformaldehyde were simultaneously charged in the same reaction vessel as used in Example 1 and reacted for 30 minutes by heating to 220° C. in sealed state. After confirming that no self-heat generation occurred, the reaction mixture was fed to a double-tube type primary stationary mixer having an inner diameter of 10 mm and a total length of 15000 mm and having twisting blades therein. Then, the reaction mixture was passed through a multiple tube heat exchanger type mixer consisting of a combination of seven stationary mixers having an inner diameter of 8 mm and a total length of 1860 mm and having twisting blades therein, and additionally a secondary and tertiary stationary mixers having the same construction as that of the primary stationary mixer, where addition condensation reaction was carried out. Adjustment of pressure and adjustment of heating of the stationary mixers and the multiple tube heat exchanger type mixer were conducted so that the reaction temperature was kept in the range of 230–240° C. during the reaction. The reaction mixture was continuously fed to the flash vessel to carry out dehydration. Thereafter, the pressure of the flash vessel was reduced to 1.3 KPa to remove unreacted phenol for 30 minutes. Then, 20 kg of acetone was added therein and completely mixed with the resulting resin, and then 20 kg of n-hexane was added to the mixture at 30° C. over a period of 30 minutes, followed by filtration through a filter cloth and treating by a vacuum dryer for 2 hours to obtain 14.6 kg of a solid novolak type phenolic resin.

Figure 7:
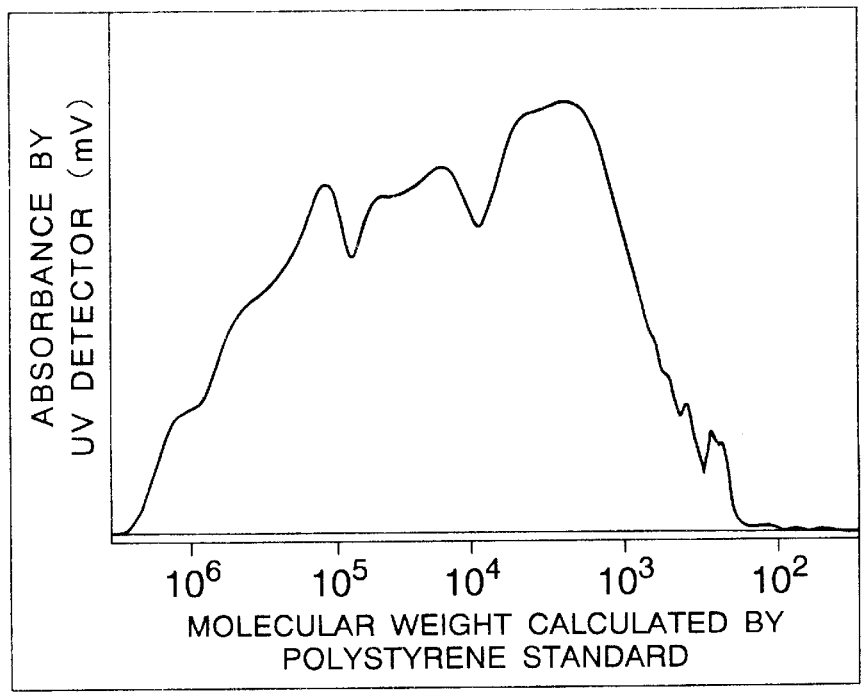
FIG. 7 is a molecular-weight distribution chart (according to GPC) of the resin obtained in Example 9.

FIG. 7 shows a molecular-weight distribution chart of the resulting resin measured by GPC.

EXAMPLE 10

9.0 kg of a novolak type phenolic resin was obtained in the same manner as in Example 9, except that 50 kg of toluene was used as a solvent for precipitation of the resin.

Figure 8:
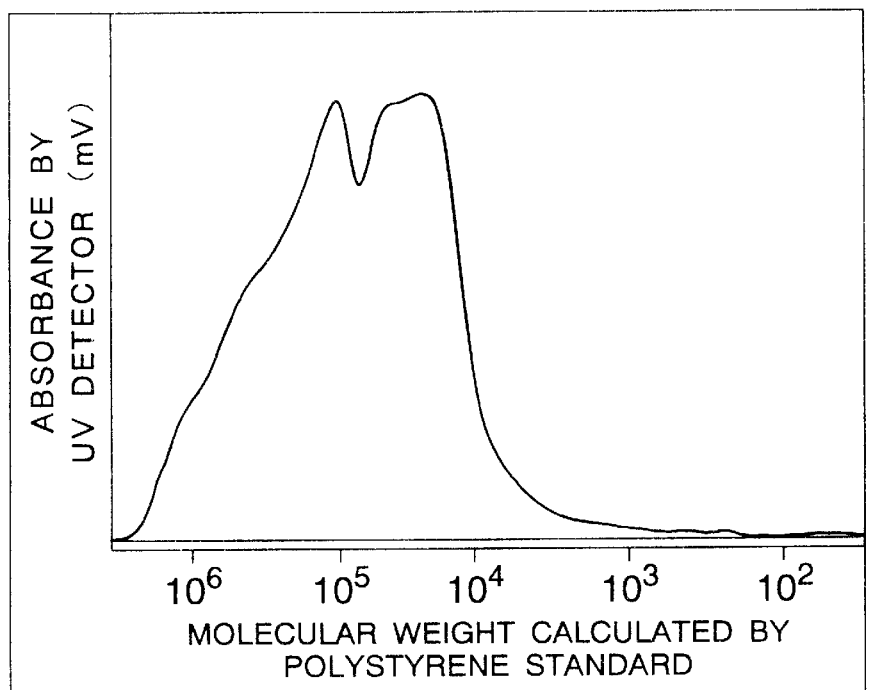
FIG. 8 is a molecular-weight distribution chart (according to GPC) of the resin obtained in Example 10.

FIG. 8 shows a molecular-weight distribution chart of the resulting resin measured by GPC.

COMPARATIVE EXAMPLE 1

22.0 kg of phenol and 0.22 kg of oxalic acid which is a representative catalyst for obtaining novolak type resins, were charged in the reaction vessel as used in Example 1, which was heated to 100° C. under normal pressure. Then, 13.1 kg of 40% formalin was gradually added thereto over 90 minutes, followed by continuing the reaction for 60 minutes while keeping 100° C. Furthermore, the resulting resin was dehydrated while heating to 130° C. under normal pressure, and then the pressure was reduced to 1.3 KPa to remove unreacted phenol until temperature of the reaction mixture reached 180 ° C. The residue was taken out on a cooling vat to obtain 21.0 kg of a novolak type phenolic resin.

COMPARATIVE EXAMPLE 2

23.0 kg of a novolak type phenolic resin was obtained in the same manner as in Comparative Example 1, except that amount of the 40% formalin was 14.7 kg.

Figure 9:
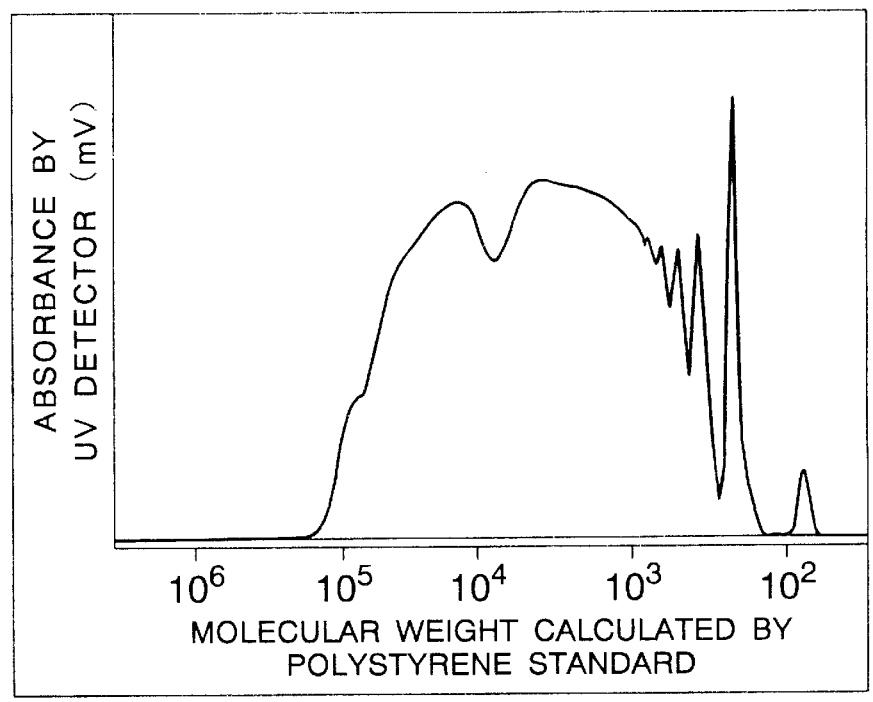
FIG. 9 is a molecular-weight distribution chart (according to GPC) of the resin obtained in Comparative Example 2, in which reference numerals indicate the following.

FIG. 9 shows a molecular-weight distribution chart of the resulting resin measured by GPC.

COMPARATIVE EXAMPLE 3

22.0 kg of phenol, 4.8 kg of 88% paraformaldehyde and 0.22 kg of zinc acetate which is a representative divalent metal salt as a catalyst for obtaining high-ortho novolak type resins, were charged in the reaction vessel as used in Example 1, which was heated to 100° C. under normal pressure. Then, the reaction was continued for 3 hours while keeping 100° C. Then, the reaction mixture was once cooled to 90° C., and thereto was added a mixture of 0.11 kg of oxalic acid and 0.33 kg of water as a condensation reaction accelerating catalyst. They were mixed for 30 minutes, and the mixture was again heated to 100° C. to carry out the reaction for 1 hour. Furthermore, the reaction mixture was dehydrated under normal pressure until the temperature reached 130° C., and then the pressure was reduced to 1.3 KPa to remove unreacted phenol until temperature of the reaction mixture reached 180° C. The residue was taken out on a cooling vat to obtain 20.0 kg of a novolak type phenolic resin.

COMPARATIVE EXAMPLE 4

20.0 kg of a novolak type cresol resin was obtained in the same manner as in Comparative Example 1, except that 22 kg of m-cresol, 11.5 kg of 40% formalin and 0.22 kg of oxalic acid were used.

COMPARATIVE EXAMPLE 5

The same reaction as in Comparative Example 1 was carried out, except that amount of formalin was 15.6 kg and the reaction time at 100° C. after the addition of formalin was 5 hours. As a result, the reaction mixture gelled at the step of removal of unreacted phenol.

COMPARATIVE EXAMPLE 6

18.0 kg of a solid novolak type phenolic resin was obtained in the same manner as in Example 1, except that after completion of the addition of formalin at 180–200° C., it was confirmed that self-heat generation did not occur, and immediately thereafter the reaction mixture was cooled to 150° C. and then dehydrated.

Properties of the novolak type phenolic resins obtained in the above examples and comparative examples are shown in Table 1.

TABLE 1

| | Molar ratio F/P | Weight-average molecular weight Mw | Content of unreacted monomer % | Percentage of high molecular weight portion % Mw 1,000,000< | Ortho-ortho bonding proportion % | Extraction water electric conductivity $\mu$S/cm | Solbility in solvent |
|---|---|---|---|---|---|---|---|
| Example | | | | | | | |
| 1 | 0.746 | 61,500 | 0.3 | 0.3 | 63 | 5 | Good |
| 2 | 0.798 | 79,400 | 6.1 | 0.4 | 66 | 6 | Good |
| 3 | — | 138,700 | 0.9 | 0.9 | 57 | 6 | Good |
| 4 | 0.750 | 90,400 | 0.6 | 0.4 | 67 | 4 | Good |
| 5 | — | 154,600 | 0.2 | 0.8 | 58 | 6 | Good |
| 6 | 0.706 | 118,000 | 0.1 | 0.0 | 63 | 6 | Good |
| 7 | 0.750 | 72,200 | 0.2 | 0.9 | 61 | 7 | Good |
| 8 | 0.746 | 52,200 | 0.3 | 0.6 | 70 | 6 | Good |
| 9 | 0.786 | 130,300 | 0.0 | 3.5 | 71 | 7 | Good |
| 10 | 0.786 | 222,200 | 0.0 | 7.2 | 68 | 7 | Good |
| Comparative Example | | | | | | | |
| 1 | 0.746 | 3,600 | 0.4 | 0.0 | 25 | 150 | Good |
| 2 | 0.837 | 13,200 | 0.5 | 0.0 | 22 | 132 | Good |
| 3 | 0.602 | 4,500 | 0.4 | 0.0 | 41 | 350 | Good |

TABLE 1-continued

| | Molar ratio F/P | Weight-average molecular weight Mw | Content of unreacted monomer % | Percentage of high molecular weight portion % Mw 1,000,000< | Ortho-ortho bonding proportion % | Extraction water electric conductivity μS/cm | Solbility in solvent |
|---|---|---|---|---|---|---|---|
| 4 | 0.786 | 11,500 | 0.6 | 0.0 | 24 | 8 | Good |
| 5 | 0.889 | Unmeasurable | Unmeasurable | Unmeasurable | Unmeasurable | Unmeasurable | Bad |
| 6 | 0.752 | 2,800 | 0.3 | 0.0 | 61 | 7 | Good |

The properties of the resins obtained in the examples and comparative examples were measured by the following methods.

1. The weight-average molecular weight was measured by gel permeation chromatography (GPC) with an ultraviolet absorption spectrum detector using polystyrene as a standard substance.

2. The unreacted monomer content was measured by capillary gas chromatography.

3. The ortho—ortho bonding proportion in novolak type phenolic resin was calculated by putting a bonding amount of methylene group obtained by $^{13}$C-NMR spectrum method in the following equation. The ortho—ortho bonding proportion in novolak type cresol resin was calculated by putting a bonding amount of methylene group obtained by Fourier-transform infrared spectroscopic analysis in the following equation.

Ortho—ortho bonding proportion=[(o—o bond)/{(o—o bond)+(o-p bond)+(p—p bond)}]×100 o—o bond: the number of methylene groups bonding at ortho—ortho position o-p bond: the number of methylene groups bonding at ortho-para position p—p bond: the number of methylene groups bonding at para—para position 4. The extraction water electric conductivity is an item which indicates content of ionic impurities in the resin, and the smaller value means the less ionic impurity content. Six grams of ground solid resin and 40 ml of pure water were charged in a pressure cooker, which was sealed and heat-treated in a thermostatic chamber at 125° C. for 20 hours. Thereafter, electric conductivity of the extraction water was measured by a conductivity meter (CM-2A manufactured by Toa Denpa Kogyo Co., Ltd.).

5. The solubility in solvent was judged in the following manner. Ten grams of the resin was introduced into 100 ml of acetone and 100 ml of tetrahydrofuran respectively and they were mixed at room temperature for 24 hours respectively, and the solubility in solvent was evaluated by the presence or absence of insoluble matters in the respective solutions.

As can be seen from the results of the examples and comparative examples, the novolak type phenolic resins obtained in the examples had very high molecular weight, while they had solubility in solvent and they were high-ortho novolak type phenolic resins having a high proportion of methylene bonding at ortho—ortho position. Furthermore, they were phenolic resins extremely small in ionic impurity content and thus were excellent in electrical insulation and moisture resistance.

As explained above, the novolak type phenolic resins of the present invention are high-molecular weight high-ortho novolak type phenolic resins of trifunctional phenol compounds which have solubility in solvent and which have not been present up to now, and furthermore which have small ionic impurities and a high proportion of methylene bonding at ortho—ortho position.

Furthermore, the cured products are excellent in heat resistance characteristics, electrical insulation and moisture resistance owing to high molecular weight and less ionic impurities of the present novolak type phenolic resins. Therefore, they can be applied to a wide variety of uses such as electric and electronic fields and thus are suitable as industrial novolak type phenolic resins.

What is claimed is:

1. A high-molecular weight high-ortho novolak type phenolic resin which is a condensate of a trifunctional phenol compound with an aldehyde compound, wherein said phenolic resin is soluble in solvents, has a weight-average molecular weight of 50,000 or more calculated by polystyrene standard, has methylene bonds at ortho—ortho position in respect to phenolic hydroxyl group in an amount of 55% or more based on total methylene bonds, and has an extraction water electric conductivity of 10 μS/cm or less.

2. A high-molecular weight high-ortho novolak type phenolic resin according to claim 1, wherein the weight-average molecular weight is 100,000 or more.

3. A high-molecular weight high-ortho novolak type phenolic resin according to claim 1, wherein a portion having a molecular weight of 1,000,000 or more is less than 1% by weight.

4. A high-molecular weight high-ortho novolak type phenolic resin according to claim 1, wherein a portion having a molecular weight of 1,000,000 or more is 1–10% by weight.

5. A high-molecular weight high-ortho novolak type phenolic resin according to claim 1, wherein the trifunctional phenol compound is phenol and/or m-cresol.

* * * * *